United States Patent
Yuuki

[11] Patent Number: 6,062,742
[45] Date of Patent: May 16, 2000

[54] STRUCTURE CONNECTING A PLASTIC FIBER TO A PHOTODETECTOR

[75] Inventor: Hayato Yuuki, Yokkaichi, Japan

[73] Assignee: Sumitomo Wiring Systems, Ltd., Yokkaichi, Japan

[21] Appl. No.: 09/146,315

[22] Filed: Sep. 3, 1998

[30] Foreign Application Priority Data

Sep. 11, 1997 [JP] Japan .................................. 9-246790

[51] Int. Cl.[7] .................................................... G02B 6/36
[52] U.S. Cl. .................................. 385/88; 385/43; 385/50
[58] Field of Search .................................. 385/88–94, 50, 385/42, 43

[56] References Cited

U.S. PATENT DOCUMENTS

| | | | |
|---|---|---|---|
| 4,668,044 | 5/1987 | D'Auria et al. | 385/88 |
| 5,247,597 | 9/1993 | Blacha et al. | 385/88 |

FOREIGN PATENT DOCUMENTS

| | | |
|---|---|---|
| 61-069008 | 4/1986 | Japan . |
| 63-023106 | 1/1998 | Japan . |

OTHER PUBLICATIONS

English Language Abstract of JP–61–069008, Apr. 9, 1986.
English Language Abstract of JP–63–023106, Jan. 30, 1998.

*Primary Examiner*—Phan T. H. Palmer
*Attorney, Agent, or Firm*—Greenblum & Bernstein, P.L.C.

[57] ABSTRACT

A structure for connecting a plastic optical fiber to a light receiving element. The plastic optical fiber has an end face that emits light. The light receiving element has a light receiving face that has a smaller surface than that of the end face of the plastic optical fiber. The structure includes a conical outer surface, a fiber-side surface, and an element-side face. The diameter of the structure decreases gradually from the fiber-side face towards the element-side face. The structure is adapted for interconnecting the end face of the plastic optical fiber and the light receiving face of the light receiving element where the connection loss therebetween is minimized.

12 Claims, 2 Drawing Sheets

STRUCTURE CONNECTING A PLASTIC FIBER TO A PHOTODETECTOR

BACKGROUND OF THE INVENTION

1. Field of the Invention

The invention relates to the field of high-speed optical communications and to a plastic optical fiber used therefor. The invention concerns in particular a connecting structure between the plastic optical fiber and a light-receiving element.

2. Description of the Prior Art

A plastic optical fiber, in general, has a wider core diameter than quartz-type optical fibers. It is therefore easy to connect plastic optical fibers to one another or to another optical element. Also, the components of the plastic optical fiber are not required to have a precise dimension. The plastic optical fiber is therefore useful for a cost-effective optical communications device, the optical alignment of which can easily be performed.

In the past, when optical communications were transmitted at a relatively slow speed, a plastic optical device was generally configured such than an end surface of the plastic optical fiber was disposed face-to-face against the light-receiving face of an optical element such as photo-diode.

However, as recent research has progressed into high-speed communications using a plastic optical fiber, there arose the problem of connection between the fiber and an optical receptor.

The response speed of a photo-diode is determined by the time span, during which the electrons, that are excited by the light entering its light-receiving portion through the light-receiving face, reach its inside electrode. In order to obtain a response speed applicable to high-speed optical communications in excess of several hundreds of Mbps, the light-receiving portion of the photo-diode has to be scaled down, so that the above-mentioned time span is shortened.

On the other hand, when the light-receiving portion is small, only a part of the light emitted from the end face of a plastic optical fiber is received therethrough, resulting in a high connection loss between the fiber and the photo-diode. The end face of a plastic optical fiber is at the end of the plastic optical fiber that faces the light-receiving portion.

SUMMARY OF THE INVENTION

The present invention has been conceived to solve the above problem. An object of the invention is therefore to provide a connecting structure between a plastic optical fiber and a light-receiving element, which minimizes connection loss caused therebetween.

To this end, there is provided a structure for connecting a plastic optical fiber to a light-receiving element. The fiber has an end face that emits light, and the light-receiving element includes a light-receiving face having a smaller surface than that of the end face of the fiber and receives the light emitted therefrom. The connecting structure has a frusto-conical outer surface, a fiber-side, and an element-side face. The diameter of the connecting structure decreases gradually from the fiber-side face toward the element-side face and is adapted for interconnecting the end face of the fiber and the light-receiving face.

In the above structure, the plastic optical fiber may have a core and a cladding portion. The fiber-side face of the connecting structure may have a size substantially the same as that of the end face of the core portion of the plastic optical fiber. The element-side face of the structure has a size substantially the same as that of the light-receiving face of the light-receiving element.

Preferably, the connecting structure is formed of a material having the same refractive index as that of the core portion of the plastic optical fiber.

Further, the connecting structure may be covered with a coating having a lower refractive index than that of the cladding portion of the plastic optical fiber.

There is further provided a structure for connecting a plastic optical fiber to a light-receiving element. The fiber has an end face that emits light. The light-receiving element includes a light-receiving face having a smaller surface than that of the end face of the fiber, and receiving the light emitted therefrom. The structure includes a frusto-conical outer surface, a fiber-side face; and an element-side face where the diameter of the structure decreases gradually from the fiber-side face towards the element-side face, and the structure is adapted for interconnecting the end face of the fiber and the light-receiving face.

According to another aspect of the present invention the plastic optical fiber has a core portion and a cladding portion. The fiber-side face of the structure has a size substantially the same as that of the end face of the core portion of the plastic optical fiber, and the element-side face of the structure has a size substantially the same as that of the light-receiving face of the light-receiving element.

According to another aspect of the present invention the plastic optical fiber has a core portion, and the structure is formed of a material having the same refractive index as that of the core portion of the plastic optical fiber.

According to another aspect of the present invention the plastic optical fiber has a cladding portion, and the structure is covered with a coating having a lower refractive index than that of the cladding portion of the plastic optical fiber.

There is further provided an optical connector that includes a plastic optical fiber where the fiber has an end face that emits light, a light receiving element for receiving light emitted from the fiber that includes a light receiving face that has a smaller surface than that of the end face of the plastic optical fiber, and a structure for connecting the plastic optical fiber to the light receiving element, where the structure includes a conical outer surface, a fiber-side face, and an element-side face. The diameter of the structure decreases gradually from the fiber-side face towards the element-side face, and is adapted for interconnecting the end face of the plastic optical fiber and the light receiving face of the light receiving element.

According to another aspect of the present invention, the plastic optical fiber has a core portion and a cladding portion, and the fiber-side face of the structure has a size substantially the same as that of the end face of the core portion of the plastic optical fiber. The element-side face of the structure has a size substantially the same as that of the light-receiving face of the light-receiving element.

According to another aspect of the present invention, the structure is formed of a material having the same refractive index as that of the core portion of the plastic optical fiber.

According to another aspect of the present invention the structure is covered with a coating having a lower refractive index than that of the cladding portion of the plastic optical fiber.

BRIEF DESCRIPTION OF THE DRAWINGS

The above and other objects, features and advantages of the present invention will become apparent from the following description of the preferred embodiments, given as a non-limiting example, with reference to the accompanying drawings and in which.

DETAILED DESCRIPTION OF THE PREFERRED EMBODIMENTS

Figure 1:
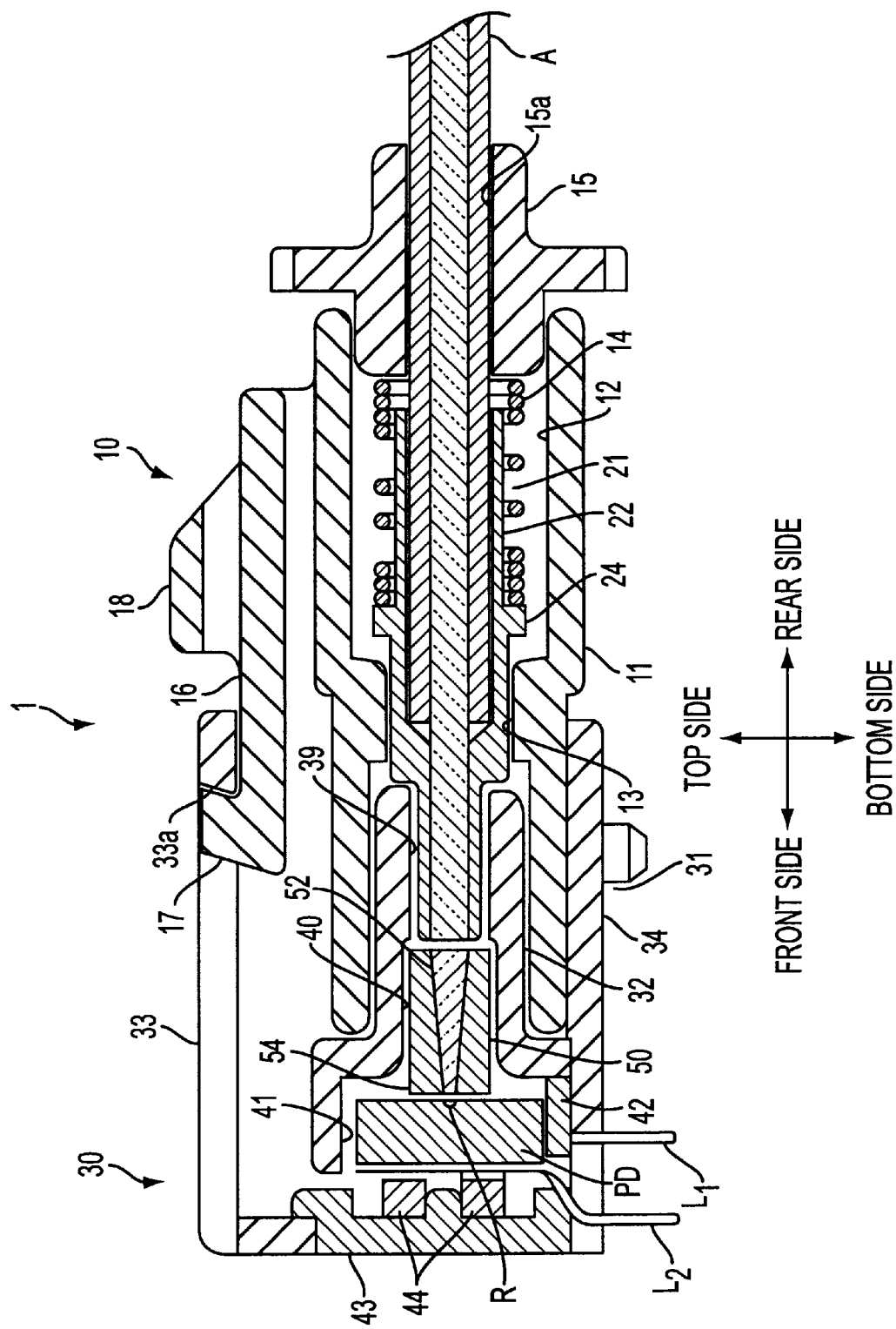
FIG. 1 shows a longitudinal cross-section of the optical connector according to an embodiment of the present invention.

An optical connector to which the connecting structure of the present invention is applied is described with reference to FIG. 1.

The optical connector 1 comprises a fiber-side (rear side in FIG. 1) housing 10 which holds a plastic optical fiber A and a module-side (front side in FIG. 1) housing 30 which contains a photo-diode PD. The light-receiving face of the photo-diode is smaller than the end face of the plastic optical fiber.

The fiber-side housing 10 includes a frame 11 and a ferrule 21 provide therein. The optical fiber A is first stripped of the coating from its end portion. The ferrule 21 having a cylindrical portion 22 which is fitted onto the region adjacent to the stripped end portion. The cylindrical portion 22 is provided with an outwardly projecting circular guard 24 about midway of the cylindrical portion 22 in the axial direction.

The frame 11 has a tubular container 12 that contains the ferrule 21. The inner diameter of the tubular container 12 is somewhat greater than the outer diameter of the guard 24 of the ferrule 21. The tubular container 12 of the frame 11 is provided, at its inner circular surface, with an inwardly projecting neck 13 which slides on the cylindrical portion 22 of the ferrule 21. The neck 13 serves to position the ferrule 21.

The ferrule 21 is surrounded by a coil spring 14 from the position behind the guard 24 toward the rear side (see FIG. 1). The tubular container 12 of the frame 11 is fitted with a cap 15 which pushes coil spring 14 from the rear side toward the front side. The coil spring 14 thus biases guard 24 of the ferrule 21 towards the front side (see FIG. 1). As a result, guard 24 abuts against neck 13 of the tubular container 12, whilst ferrule 21 is prevented from rear movement. The cap 15 is provided with a hole 15a, into which the optical fiber A is inserted. By this movement, the position of the fiber A at the rear side of tubular container 12 is determined.

The top side of fiber-side housing 10 is provided with an elongate stopper 16 extending from the rear side to about midway of the housing 10. This stopper 16 includes a bracket 17 at its end portion. Correspondingly, the module-side housing 30 (front side in FIG. 1) has an abutment 33a. Bracket 17 and abutment 33a are removably attachable to each other. When the bracket 17 and knob 33a are engaged, module-side housing 30 and fiber-side housing 10 fit firmly.

The elongate stopper 16 is equipped with a handle 18. When handle 18 is pushed down, abutment 33a is released from bracket 17, and housing 10 and 30 can be separated from each other.

The module-side housing 30 includes a frame 31 and an inner housing 32. The frame 31 of the module-side housing 30 forms a box shape which is opened up in the axial direction of the fiber A. The frame also comprises a top plate 33 and a bottom plate 34. Part of the top plate 33 is recessed to form abutment 33a that engages with bracket 17 and holds the fiber-side housing 10.

The front side of inner housing 32 is fixed to the inner surface of the bottom plate 34 in housing 31. This inner housing includes a cylindrical guide 39 which is located towards the rear side, and receives the terminal portion of ferrule 21 installed in the fiber-side housing 10. The inner housing 32 also includes an opening 41, for housing photo-diode PD, at its front side and an intermediate opening 40 between opening 41 and cylindrical guide 39. The intermediate opening holds a relaying element 50, which will be described later.

The cylindrical guide 39 is arranged in a position that allows ferrule 21 of the fiber-side housing 10 to pass there through. When ferrule 21 passes through cylindrical guide 39, it arrives at a predetermined position in the module-side housing 30 and is held at this position.

The PD opening 41, together with base plate 42, forms an inside space corresponding to the outer shape of photo-diode PD. When photo-diode PD is inserted into PD opening 41, it rests on base plate 42. The front side of frame 31 of module-side housing 30 is then capped with a lid 43 having spacers 44. Through spacers 44, the photo-diode PD is pushed toward guide 39 and immobilized in this state. A pair of lead wires $L_1$ and $L_2$ extend from the bottom of photo-diode PD. Lead wire $L_1$ passes through base plate 42. Lead cord $L_2$ passes through the space between base plate 42 and lid 43. Lead wires $L_1$ and $L_2$ are led away from the module-side housing 30.

The photo-diode PD has a light-receiving portion R. In the above-mentioned state, the light-receiving portion R is positioned in line with the central axis of ferrule 21, fixedly positioned at a predetermined site by guide 39.

The intermediate opening 40, located between guide 39 and PD opening 41, has an inner diameter slightly greater than that of guide 39, so that the relaying element 50 can be contained therein.

The relaying element 50 includes a relay ferrule 54, which contains a connecting structure, such as light-relay element 52, inside. The light-relay element 52 is made of a material having the same refractive index as the core portion of the plastic optical fiber A. The rear end face of light-relay element 52 has a size comparable to the end face of the plastic optical fiber A, whilst its front end face, the face towards photo-diode PD, has a size comparable to the light-receiving face of the light-receiving portion R in the photo-diode PD. In addition, the diameter of light-relay element 52 decreases gradually from the rear side to the front side. Further, the surrounding surface of light-relay element 52 is protected with a coating having a refractive index smaller than that of the cladding of plastic optical fiber A.

The above-mentioned light-relay element 52 can be manufactured, for instance, by heating a plastic optical fiber, drawing the hot fiber through both ends, solidifying the fiber under cooling and cutting out a tapered portion therefrom. The element 52 can be protected by painting a low refractive-index resin therearound.

The relay ferrule 54 is provided with an internal shape corresponding to the outer shape of light-relay element 52 and fixedly contains light-relay element 52. The light-relay element 52 is thus contained in the intermediate opening 40 via relay ferrule 54. The element 52 is positioned therein such that its rear end face, with the large surface, faces the end face of the guide 39, whilst its front end face, with a small surface, is opposed to the light-receiving face of photo-diode PD. The front end face is either in contact or in close proximity to the photo-diode PD. When the fiber-side housing 10 and the module-side housing 30 are assembled, plastic fiber A is positioned in guide 39 via ferrule 21 and the end face of plastic optical fiber A faces the rear side of light-relay element 52.

In this embodiment of optical connector 1, when fiber-side housing 10 is inserted into the rear side of module-side housing 30, ferrule 21 is introduced into guide 39, and engaged therewith. As a result, plastic optical fiber A, relay element 52 and light-receiving portion R of the photo-diode PD are placed on the same optical axis.

Then, bracket 17 on elongate stopper 16 is engaged with the abutment 33a, so that both housings 10, 30 are locked together.

Figure 2:
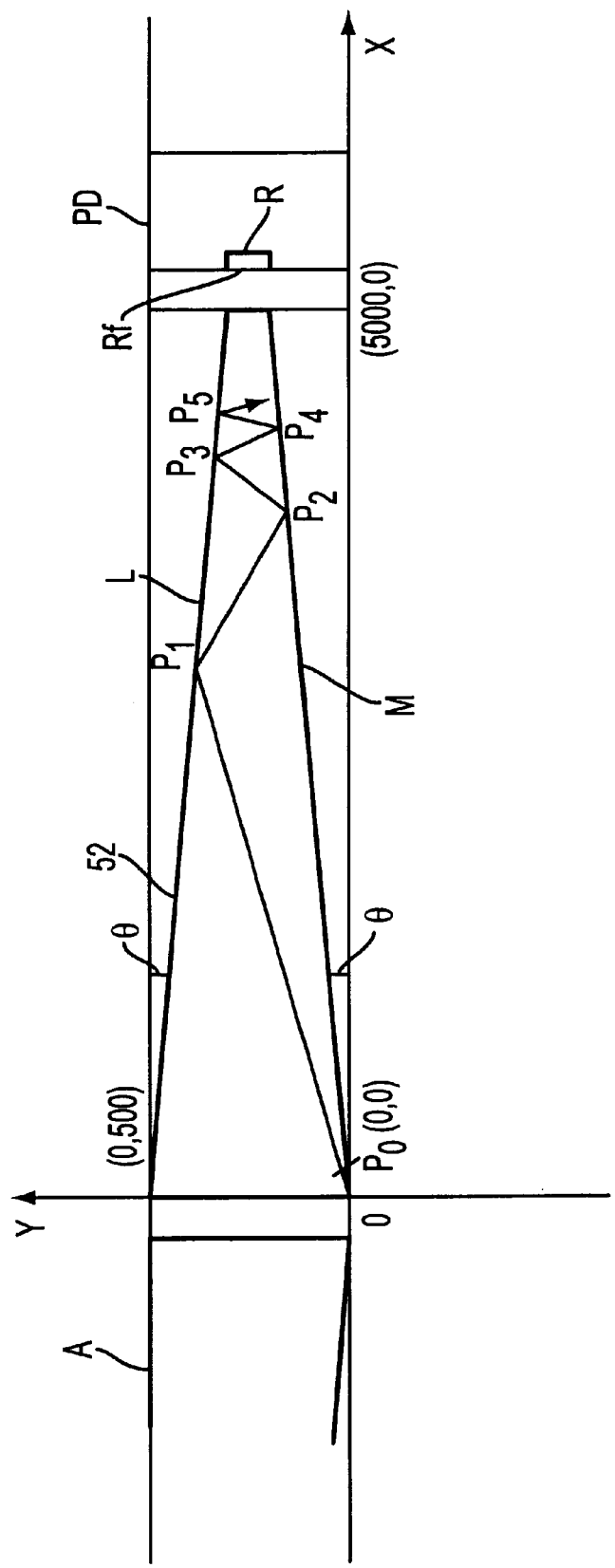
FIG. 2 shows a schematic longitudinal cross-section of a structure connecting a plastic optical fiber and a photo-diode, and the light transmission pattern observed inside it according to the present invention.

FIG. 2 schematically illustrates a light path, according to which the light emitted from the end face of a plastic optical fiber A passes through the light-relay element 52 and enters the photo-diode PD.

In this figure, the core diameter of the plastic optical fiber A, its numerical aperture, 5 and the diameter of light-receiving face (Rf) of photo-diode PD may measure respectively 500 µm, 0.3 µm, and 100 µm. Correspondingly, the end face diameter of the light-relay element 52 at the side of the optical fiber A, its end face diameter at the side of the photo-diode PD, and its length may measure 500 µm, 100 µm and 5,000 µm, respectively. FIG. 2 also shows abscissa X and ordinate Y, drawn, as the origin, from the lowermost point P0 of the end face of light-relay element 52 at the side of optical fiber A.

In this case, the cross-section along the optical axis of light-relay element 52 defines the length of upper and lower straight lines L and M, formed by the circular surface. The inclination angle θ of the lines L and M can be calculated as about 2.3° from a measure ±tan (200/5,000). Accordingly, line L can be represented by the equation $$G1(x) = -\tan(2.3) \times x + 500, \quad (1)$$

while line M can be represented by $$G2(x) = \tan(2.3) \times x, \quad (2)$$

where x is the value along the abscissa X.

When plastic optical fiber A has a numerical aperture 0.3, the light advancing therein forms an inclination angle of about 7.7° in respect to its center axis, i.e., abscissa X. When the light enters light-relay element 52 and is reflected at a point near P0, the-light is given with an inclination of 2θ=4.6°. The light-path line P0 P1 is represented by the equation $$f1(x) = \tan(12.3) \times x. \quad (3)$$

Further, the light forms a second reflection point P1 on the circular surface of the light-relay element 52. This point is determined to be P1 (1936.5, 422.2), according to the equation $$f1(x) = G1(x). \quad (4)$$

The light reflected at point P1 follows the path line P1P2. This line is represented by the equation $$f2(x) = -\tan(16.9) \times x + 1010.6. \quad (5)$$

Accordingly, the upcoming reflecting point on the circular surface of relay element 52 is point P2 (2937.9, 118.0), according to the equation $$f2(x) = G2(x). \quad (6)$$

Further, the light reflected at point P2 follows the path line P2P3 represented by the equation $$f3(x) = \tan(21.5) \times x - 1039.3. \quad (7)$$

The upcoming reflecting point at the slant surface of the relay element 52 is therefore P3 (3546.2, 357.6), according to the equation $$f3(x) = G1(x). \quad (8)$$

Likewise, the light is repeatedly reflected inside the light-relay element 52, gradually led into the smaller diameter region thereof and then emitted from the small end face of the element 52. The emitted light enters the light-receiving face Rf of the photo-diode PD. In FIG. 2, the end face of the light-relay element 52 and the light-receiving face Rf are shown separated for the purpose of better illustration. However, in normal state, they are placed very closely together, or in actual contact with each other.

According to this connecting structure embodiment, the light emitted from the end face of the plastic optical fiber A is passed through the light-relay element 52 and led into the smaller diameter region, so that the light is converged. The converged light is emitted from the small end face of the light-relay element 52 and enters the light-receiving face Rf of the photo-diode PD. A plastic fiber A having a large core diameter and a photo-diode PD having a small-diameter light-receiving face Rf are thus connected, and any optical loss due to the connection is minimized. Preferably, the plastic fiber side of the light-relay element 52 is scaled so as to approximately correspond to the core size of the plastic fiber. As a result, the light exiting from the end face of the fiber A is efficiently led into light-relay element 52. Likewise, the photo-diode side end face of the light-relay element 52 is scaled into about the same size as the light-receiving face Rf. Consequently, the light exiting from the light-relay element 52 can be efficiently recovered by the light-receiving face Rf. These preferred structures can further minimize the optical loss.

In the past, when molding a photo-diode into a resin package, a hemispherical lens was laid therein during the molding, thereby forming a 'photo-diode' in a broader sense. By virtue of this hemispherical lens, the light emitted from the plastic fiber end face could be converged.

However, optical fibers currently used have a different level of numerical aperture. Therefore, when the converging capacity of the hemispherical lens and the optical fiber are not matched, a considerable amount of optical loss is to be expected.

In contrast, the connecting structure according to the invention allows easy selection of an appropriate light-relay element 52 which matches the numerical aperture of the plastic optical fiber. The connecting structure according to the present invention, thus, has a wider use.

To cover the front side of a photo-diode, a polycarbonate-type multi-functional resin (epoxy resin) is commonly used. This type of resin has a refractive index of 1.56 to 1.59 after hardening, which is relatively high. Accordingly, when the light emitted from the light-relay element 52 enters the resin, the light is refracted so as to form an angle nearer to a perpendicular direction to the light-receiving face Rf. Due to this phenomenon, the connecting loss is minimized.

Further, the outer circular surface of the light-relay element 52 is surrounded with a protection coating layer having a lower refractive index than that of the cladding portion of the plastic optical fiber A. The farther the light propagates in the light-relay element 52, the greater becomes the angle of the light against the axial center. By virtue of the above-mentioned coating layer, such a light can be efficiently reflected.

As a component for connection, an optical connector 1 having the same constitution as the one described for the above-mentioned embodiment is used.

The light-relay element 52 may be prepared from a product SI-POF (Step Index-Plastic Optical Fiber) manufactured by Asahi Kogaku Kogyo Kabushiki Kaisha, which has an outer diameter of 750 µm, a refractive index difference of 0.02, and a transmission loss of 230 dB/km. A weight of 100 grams is hung on the end portion of the product SI-POF via a string, such as a kite string. Then, part of the product covering a length of 10 mm is drawn under the heat at 150° C. and hardened, so as to obtain a heat-deformed, tapered portion. This portion is cut out. By varying the heating time from 5 to 10 seconds, the taper angle of the outer circular face of the light-relay element 52 is varied. In this way, several kinds of tapered portion are obtained.

The intermediate ferrule 54 can be prepared by cutting a brass material and forming a hollow therein capable of containing the light-relay element 52.

As the light source for measure, LED module of GL link manufactured by Sumitomo Wiring Systems may be used. This module can be continuously driven through a finely stabilized electrical source, such that a light having a central wavelength of 700 nm in LED module is emitted at an output of 3 dBm.

The light belonging to this LED module is led to the photo-diode PD through a plastic optical fiber. This fiber may be obtained by cutting a 2 m-length out of fiber SI-POF manufactured by Asahi Kogaku Kogyo Kabushiki Kaisha.

The connection loss may be measured by an Optical Power Meter (Product Number 3292) manufactured by Yokogawa, in which its wavelength-sensitivity center is set up to 700 nm. The sensor unit of this apparatus may be arranged in container 41 in the module-side housing 30 instead of photo-diode PD.

In an embodiment of the connecting structure of the present invention, there are eleven pieces of light-relay element 52 having a greater end face of 750 µm, and a smaller end face varying from 250 to 750 µm by an increment of 50 µm. Successively using these different pieces of light-relay element 52, the light output from the smaller end face thereof is measured. The results are represented in Table I.

TABLE I

| Taper end diameter (µm) | Light arriving at the taper end (dBm) | Surface proportion (%) | PD reception loss (dB) | Actual PD input (dBm) | Gain due to taper (dB) |
|---|---|---|---|---|---|
| 250 | −15.519 | 100.00 | 0.000 | −15.519 | 5.139 |
| 300 | −14.974 | 69.44 | −1.584 | −16.558 | 4.101 |
| 350 | −14.477 | 51.02 | −2.923 | −17.400 | 3.259 |
| 400 | −14.821 | 39.06 | −4.082 | −18.903 | 1.755 |
| 450 | −14.309 | 30.86 | −5.105 | −19.414 | 1.244 |
| 500 | −13.104 | 25.00 | −6.021 | −19.125 | 1.534 |
| 550 | −13.104 | 20.66 | −6.848 | −19.952 | 0.706 |
| 600 | −12.413 | 17.36 | −7.604 | −20.017 | 0.641 |
| 650 | −12.252 | 14.79 | −8.299 | −20.551 | 0.107 |
| 700 | −11.722 | 12.76 | −8.943 | −20.665 | −0.007 |
| 750 | −11.116 | 11.11 | −9.542 | −20.658 | 0.000 |

In Table I, the column heading "Surface proportion" indicates the surface ratio of the light-receiving face of photo-diode PD with respect to the small end face of light-relay element 52. When the light emitted from the small end face of light-relay element 52 enters the light-receiving face Rf of photo-diode PD, the light loss occurred is supposed to depend on this surface proportion. Accordingly, the connection loss (PD entrance loss) between light-relay element 52 and photo-diode PD is calculated on the basis of this surface proportion as follows:

$$\text{PD entrance loss [dB]} = 10 \log_{10}(\text{surface proportion}) \quad (9)$$

Adding the calculated PD entrance loss (in negative terms, see Table I) to the light output at the small end face of light-relay element 52 (likewise in negative terms) gives the effective connection input (actual PD input, in negative terms) obtained through light-relay element 52 interposed between the plastic optical fiber and the photo-diode PD.

Further, on the basis of the actual PD input obtained for the light-relay element 52 having end faces of 750 µm diameter, i.e., when its outer cylindrical surface is not tapered, those for the other light-relay element is calculated by subtracting the difference and represented as the gain due to taper.

According to Table I, the smaller the diameter of the small end face of the light-relay element 52, i.e., the greater the degree of tapering is, the lower the light output therefrom is. On the other hand, the light loss occurring when the light enters from the light-relay element 52 into the photo-diode PD must also be taken into consideration. Then, generally speaking, the smaller the small end face diameter of the light-relay element 52, the greater the actual PD input. Consequently, when a small end face having a diameter of 250 µm is compared with a small end face having a diameter of 750 µm, there is a gain of 5.139 dB of light to the photo-diode PD input.

As mentioned above, when the diameter of light-relay element 52 is gradually reduced from one end to the other, the light loss between the plastic optical fiber A and the photo-diode PD decreases. In particular, when the small end face of light relay-element 52 has a size corresponding to that of the light-receiving face of the photo-diode PD, the connection loss is minimized.

According to the connecting structure of the present invention, the light-relay element 52 is interposed between an end face of a plastic optical fiber and the light-receiving face of a light-receiving element. Further, the light-relay element 52 has a diameter gradually decreasing from the plastic optical fiber side towards the light-receiving face. Then, the light emitted from the end face of the plastic optical fiber is converged through the light-relay element and enters the light-receiving face of the light-receiving element, photo-diode PD. Accordingly, a greater part of the light coming from the fiber end face enters the light-receiving face, with the result that the connection loss therebetween can be minimized.

Further, the plastic fiber side of the light-relay element is scaled so as to correspond approximately to the core size of the plastic fiber, whilst its light-receiving element side end face is scaled into about the same size as the light-receiving face of the light-receiving element. As a result, the light leaving from the end face of the fiber can be efficiently recovered by the light-receiving face of the light-receiving element. The optical loss can thus be further minimized.

The diameter of the light-relay element is formed so as to decrease gradually from its fiber-side end face towards the light-receiving element. As the light advances inside it, the angle with which the light is directed towards the cylindrical surface of the light-relay element becomes greater gradually. Therefore, when the outer cylindrical surface of the light-relay element is protected by a coating having a refractive index lower than that of the fiber's cladding portion, the light can be efficiently transmitted.

The present disclosure relates to subject matter contained in Japanese Patent Application No. HEI 9-246790 (filed on Sep. 11, 1997) which is herein incorporated by reference in its entirety.

The present invention has been illustrated using one embodiment. This invention is not limited by this, but is meant to cover this and all other applications or embodiments that are within the spirit and scope of the invention.

What is claimed:

1. A structure for connecting a plastic optical fiber to a light-receiving element, said fiber having an end face that emits light, said light-receiving element comprising a light-receiving face having a smaller surface than that of said end face of the fiber, and receiving said light emitted therefrom, said structure comprising:

a frusto-conical outer surface;

a fiber-side face; and a light-receiving element-side face;

wherein the diameter of said structure decreases gradually from said fiber-side face towards said element-side face, said structure being adapted for interconnecting said end face of the fiber and said light-receiving face.

2. The structure according to claim 1, wherein said plastic optical fiber has a core portion and a cladding portion, said fiber-side face of said structure having a size substantially the same as that of said end face of said core portion of said plastic optical fiber, said element-side face of said structure having a size substantially the same as that of said light-receiving face of said light-receiving element.

3. The structure according to claim 1, wherein said plastic optical fiber has a core portion, said structure formed of a material having the same refractive index as that of said core portion of said plastic optical fiber.

4. The structure according to claim 2, wherein said structure formed of a material having the same refractive index as that of said core portion of said plastic optical fiber.

5. The structure according to claim 1, wherein said plastic optical fiber has a cladding portion, and said structure is covered with a coating having a lower refractive index than that of said cladding portion of said plastic optical fiber.

6. The structure according to claim 2, wherein said structure is covered with a coating having a lower refractive index than that of said cladding portion of said plastic optical fiber.

7. The structure according to claim 3, wherein said plastic optical fiber has a cladding portion, and said structure is covered with a coating having a lower refractive index than that of said cladding portion of said plastic optical fiber.

8. The structure according to claim 4, wherein said structure is covered with a coating having a lower refractive index than that of said cladding portion of said plastic optical fiber.

9. An optical connector comprising:

a plastic optical fiber, said fiber having an end face that emits light;

a light receiving element for receiving light emitted from said fiber, said element including a light receiving face having a smaller surface than that of the end face of said plastic optical fiber; and a structure for connecting said plastic optical fiber to said light receiving element, said structure comprising:

a conical outer surface, a fiber-side face, and a light-receiving element-side face, the diameter of said structure decreasing gradually from the fiber-side face towards the element-side face, said structure being adapted for interconnecting the end face of said plastic optical fiber and the light receiving face of said light receiving element.

10. The connector according to claim 9, wherein said plastic optical fiber has a core portion and a cladding portion, said fiber-side face of said structure having a size substantially the same as that of said end face of said core portion of said plastic optical fiber, said element-side face of said structure having a size substantially the same as that of said light-receiving face of said light-receiving element.

11. The connector according to claim 10, wherein said structure is formed of a material having the same refractive index as that of said core portion of said plastic optical fiber.

12. The connector according to claim 10, wherein said structure is covered with a coating having a lower refractive index than that of said cladding portion of said plastic optical fiber.

* * * * *